(12) United States Patent
Remmert

(10) Patent No.: US 7,599,171 B1
(45) Date of Patent: Oct. 6, 2009

(54) ELECTRICAL DISTRIBUTION PANEL INCLUDING FIRST NON-CRITICAL LOAD BUS AND SECOND CRITICAL LOAD BUS

(75) Inventor: Scot E. Remmert, Mt. Pulaski, IL (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 12/172,504

(22) Filed: Jul. 14, 2008

(51) Int. Cl.
*H02B 1/04* (2006.01)
*H02J 9/00* (2006.01)

(52) U.S. Cl. .................... 361/631; 307/64; 361/634; 361/641; 361/643

(58) Field of Classification Search .............. 200/50.32, 200/50.33; 361/631, 634, 641
See application file for complete search history.

(56) References Cited

U.S. PATENT DOCUMENTS

| | | | | |
|---|---|---|---|---|
| 4,398,097 | A | * | 8/1983 | Schell et al. .................. 307/64 |
| 4,423,336 | A | * | 12/1983 | Iverson et al. ................. 307/64 |
| 4,747,061 | A | | 5/1988 | Lagree et al. |
| 4,894,796 | A | | 1/1990 | Engel et al. |
| 5,210,685 | A | | 5/1993 | Rosa |
| 5,397,868 | A | | 3/1995 | Smith et al. |
| 5,761,027 | A | * | 6/1998 | Flegel .......................... 361/664 |
| 6,100,604 | A | | 8/2000 | Morroni et al. |
| 6,181,028 | B1 | | 1/2001 | Kern et al. |
| 6,791,211 | B1 | * | 9/2004 | Flegel ........................ 307/113 |
| 6,849,967 | B2 | | 2/2005 | Lathrop et al. |
| 6,980,911 | B2 | | 12/2005 | Eaton et al. |
| 6,995,327 | B1 | | 2/2006 | Shepstone et al. |
| 7,005,760 | B2 | | 2/2006 | Eaton et al. |
| 7,157,811 | B2 | | 1/2007 | Eaton et al. |
| 7,239,045 | B2 | * | 7/2007 | Lathrop et al. ................ 307/80 |
| 7,259,481 | B2 | | 8/2007 | Eaton et al. |
| 7,336,003 | B2 | | 2/2008 | Lathrop et al. |
| 7,418,314 | B2 | * | 8/2008 | Rasmussen et al. ......... 700/286 |
| 7,449,645 | B1 | * | 11/2008 | Flegel ..................... 200/51.11 |
| 7,462,791 | B1 | * | 12/2008 | Flegel ..................... 200/50.32 |
| 2006/0028069 | A1 | | 2/2006 | Loucks et al. |
| 2008/0088182 | A1 | | 4/2008 | Lathrop |
| 2009/0021079 | A1 | * | 1/2009 | Johnson et al. .............. 307/68 |

\* cited by examiner

*Primary Examiner*—Gregory D Thompson
(74) *Attorney, Agent, or Firm*—Martin J. Moran

(57) ABSTRACT

A load center includes an enclosure, a first power input, a second power input, a first circuit breaker having a line terminal electrically connected to the first power input and a load terminal, a first bus electrically connected to the load terminal, a number of independent second circuit breakers powered from the first bus, a second bus, a number of independent third circuit breakers powered from the second bus, and a transfer switch having a first input electrically connected to the first bus, a second input electrically connected to the second power input, and an output electrically connected to the second bus. The transfer switch selectively electrically connects one of its first and second inputs to its output. The first bus and the second circuit breakers power only a number of non-critical loads. The second bus and the third circuit breakers power only a number of critical loads.

23 Claims, 5 Drawing Sheets

ELECTRICAL DISTRIBUTION PANEL INCLUDING FIRST NON-CRITICAL LOAD BUS AND SECOND CRITICAL LOAD BUS

BACKGROUND OF THE INVENTION

1. Field of the Invention

This invention pertains generally to electrical distribution panels and, more particularly, to electrical distribution panels accommodating non-critical loads and critical loads being supplied with power from a second power source in response to power from a first power source becoming unacceptable.

2. Background Information

Electrical distribution panels, such as load centers, incorporate a plurality of circuit breakers and provide a safe and controllable distribution of electric power. Such load centers have become a common feature in both residential and commercial applications. Increasingly, such load centers are utilized in installations that incorporate, for example, an electric generator as a second power source in the event that a utility service serving as a first power source fails or becomes unacceptable.

With technological progress resulting in ever more uses for electricity, the amount of electrical power required for both residential and commercial applications has steadily increased, and this had lead to increased demand for relatively larger electric generators. Unfortunately, relatively larger electric generators present various disadvantages over relatively smaller electric generators. While smaller electric generators are typically air cooled, larger electric generators typically require a liquid cooling system with a circulation pump and radiator, thereby adding to both the costs and complexities of operating and maintaining a larger generator in comparison to a smaller generator. Larger generators also require relatively larger quantities of maintenance fluids, including lubrication oil and coolant liquid.

A known proposal for either new construction or the retrofit of existing installations involves the addition of a separate load center panel for critical circuits. This separate load center panel receives a backup power source and, also, manually switches between a utility power source and the backup power source. This can be utilized in installations that incorporate the backup power source, such as an electric generator, in the event that the utility power source becomes unacceptable (e.g., without limitation, fails; becomes unreliable; becomes unavailable). This can provide, for instance, reliable electric power for doctor's offices away from hospitals, home-based businesses and home-based chronic patient care support. For existing installations, this requires that the critical circuits be moved (e.g., rewired) from a first load center to the separate load center panel. However, it requires significant time and effort to rewire a load center in order to electrically connect a backup power source, such as an electric generator or other auxiliary power unit (APU) (e.g., a device whose purpose is to provide electrical energy), to critical circuits in, for example, residential and relatively smaller scale commercial structures.

Transfer switches are well known in the art. See, for example, U.S. Pat. Nos. 6,181,028; 5,397,868; 5,210,685; 4,894,796; and 4,747,061. Transfer switches operate, for example, to transfer a power consuming load from a circuit with a normal power supply to a circuit with an auxiliary power supply. Applications for transfer switches include stand-by applications, among others, in which the auxiliary power supply stands-by if the normal power supply should fail. Facilities having a critical requirement for continuous electric power, such as hospitals, certain plant processes, computer installations, and the like, have a standby power source, often a diesel generator. A transfer switch controls electrical connection of the utility lines and the generator to the facility load buses. In many installations, the transfer switch automatically starts the generator and electrically connects it to the load bus upon loss of utility power, and electrically reconnects the utility power source to the load bus if utility power is reestablished.

Another known proposal employs a single interlock between a main circuit breaker and a manual transfer switch. In response to loss of utility power, the user must first manually turn off any non-critical circuits, turn off the main circuit breaker, and then turn on the transfer switch. The manual sequence is reversed when utility power has returned.

Some known proposals provide mechanical interlocks between a main circuit breaker and a generator circuit breaker.

Other known proposals require that the entire load be switched from the utility power source to the generator power source. In other words, the loads are not separated into critical loads and non-critical loads.

U.S. patent application Ser. No. 12/043,514 discloses a first bus powered from a first circuit breaker and a first power input, a second bus, a transfer switch including a first input electrically connected to the first bus, a second input electrically connected to a second power input, and an output electrically connected to the second bus, and a number of pairs of circuit breakers. The number of pairs of circuit breakers include a second circuit breaker powered from the first bus, a third circuit breaker powered from the second bus, a power output powered from the second and third circuit breakers, and an interlock cooperating with the second and third circuit breakers and structured to prevent both of the second and third circuit breakers from being closed at the same time.

NEC 2008, Optional Standby Systems, provides in Section 702.5(2)(a)-(b) that where automatic transfer equipment is used, an optional standby system shall comply with either: (a) the standby source shall be capable of supplying the full load that is transferred by the automatic transfer equipment, or (b) where a system is employed that will automatically manage the electrically connected load, the standby source shall have a capacity sufficient to supply the maximum load that will be electrically connected by the load management system. Hence, for an automatic transfer switch, the standby system must be able to handle the entire load that is transferred.

There is room for improvement in electrical distribution panels.

SUMMARY OF THE INVENTION

There is a need for electrical distribution panels receiving power from a first power source that can readily be reconfigured to also provide operation from a second power source.

There is further a need for such reconfigurable electrical distribution panels that do not require unnecessary costs or components when initially configured for operation from a single power source or when reconfigured to also provide operation from a second power source.

These needs and others are met by embodiments of the invention, which permit a user of an electrical distribution panel to predetermine during installation which loads will be switched to a second power source (e.g., without limitation, a generator) during the loss of a first power source (e.g., without limitation, a utility). By installing the critical loads in only one section of the electrical distribution panel, those will be the only loads that are switched over to the second power source when the first power source becomes unacceptable.

This switches the entire set of critical loads at one time and provides the option of installing, for example, a relatively smaller second power source than would be required if the electrical distribution panel had to switch the entire load.

In accordance with one aspect of the invention, an electrical distribution panel comprises: an enclosure; a first power input; a second power input; a first circuit interrupter including a first terminal electrically connected to the first power input and a second terminal; a first bus electrically connected to the second terminal of the first circuit interrupter; a number of second circuit interrupters powered from the first bus; a second bus; a number of third circuit interrupters powered from the second bus; a transfer switch including a first input electrically connected to the first bus, a second input electrically connected to the second power input, and an output electrically connected to the second bus, the transfer switch being structured to selectively electrically connect one of the first and second inputs of the transfer switch to the output of the transfer switch, wherein the first bus and the number of second circuit interrupters are structured to power only a number of non-critical loads, wherein the second bus and the number of third circuit interrupters are structured to power only a number of critical loads, which are different than the number of non-critical loads, and wherein the second circuit interrupters operate independently from the third circuit interrupters.

The transfer switch may be an automatic transfer switch. A closed circuit interrupter may electrically connect the first input of the automatic transfer switch to the first bus. A sub-feed lug block may electrically connect the output of the automatic transfer switch to the second bus.

The enclosure may comprise a first compartment enclosing the first circuit interrupter, the first bus, the number of second circuit interrupters, the second bus, and the number of third circuit interrupters, and may further comprise a separate second compartment enclosing the transfer switch.

The enclosure may further comprise a barrier separating the first compartment from the separate second compartment.

As another aspect of the invention, an electrical distribution panel comprises: an enclosure comprising a first compartment and a separate second compartment; a first power input; a first circuit interrupter including a first terminal electrically connected to the first power input and a second terminal; a first bus electrically connected to the second terminal of the first circuit interrupter; a plurality of second circuit interrupters powered from the first bus; a second bus electrically connected to the first bus through one of the second circuit interrupters; a number of third circuit interrupters powered from the second bus; wherein the first bus and the number of second circuit interrupters are structured to power only a number of first loads, wherein the second bus and the number of third circuit interrupters are structured to power only a number of second loads, and wherein the second compartment is structured to receive a transfer switch including a first input electrically connectable to the first bus, a second input electrically connectable to a second power input, and an output electrically connectable to the second bus, the transfer switch being structured to selectively electrically connect one of the first and second inputs of the transfer switch to the output of the transfer switch.

Hence, a user, such as a home owner, can install an electrical distribution panel, such as, for example and without limitation, a load center panel, at the time of construction and use that load center panel as a conventional load center until, at a later date, they can afford to purchase and install a second power source (e.g., without limitation, a generator) and a transfer switch.

The transfer switch may be an automatic transfer switch. The one of the second circuit interrupters may be a closed circuit breaker comprising a line terminal electrically connected to the first bus, and a load terminal electrically connected to the second bus. A sub-feed lug block and a number of conductors may electrically connect the load terminal of the one of the second circuit interrupters to the second bus; and the number of conductors may be removable to permit the first input of the transfer switch to be electrically connected to the load terminal of the one of the second circuit interrupters, and to permit the output of the transfer switch to be electrically connected to the second bus.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "electrical distribution panel" shall mean a load center or a panelboard (e.g., without limitation, a lighting and appliance panelboard; a Class CTL enclosed panelboard).

As employed herein, the term "critical load" shall mean a load that needs to be powered from one of a primary power source and an alternate backup power source during all times or during substantially all times. Non-limiting examples of critical loads include heating, ventilation and air conditioning (HVAC) loads; sump pumps; refrigerators; freezers; alarm systems; essential loads; medical equipment; and emergency loads.

As employed herein, the term "non-critical load" shall mean a load other than a critical load. Non-limiting examples of non-critical loads include non-essential loads; non-emergency loads; and not critical loads.

The invention is described in association with a load center accepting input from power sources having two legs, although the invention is applicable to any electrical distribution panel having suitable current ratings for critical and non-critical loads and accepting input from power sources having any number of legs or phases.

Figure 1:
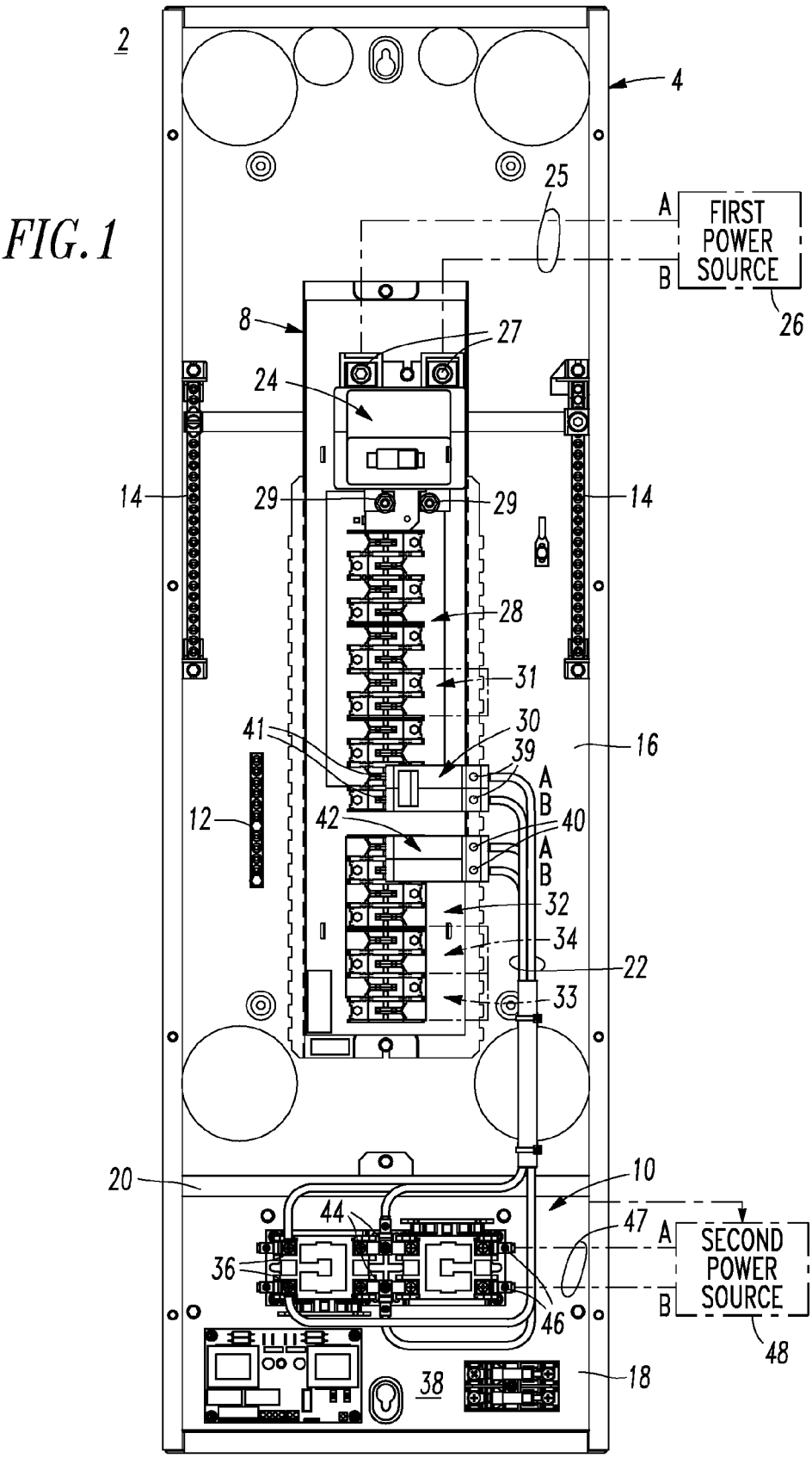
FIG. 1 is a vertical elevation view of a load center with the front covers removed to show internal structures in accordance with embodiments of the invention.
Figure 2:
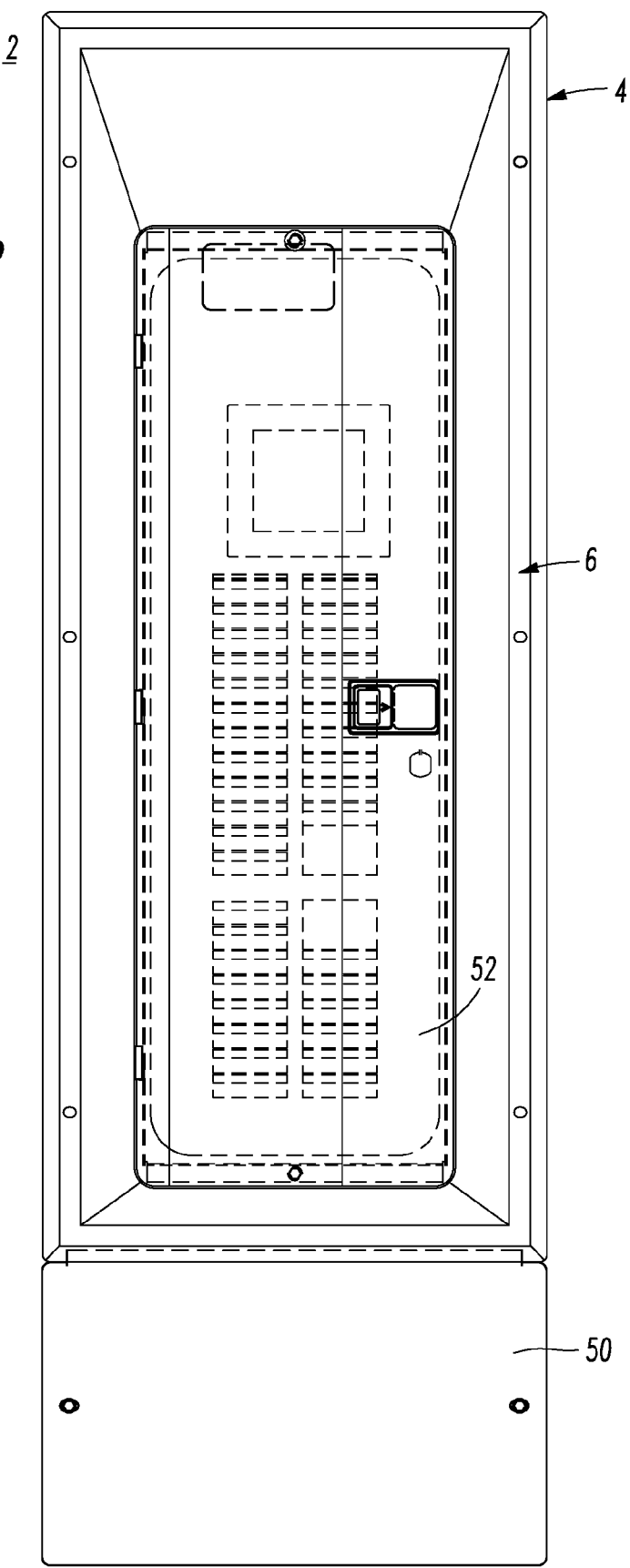
FIG. 2 is a vertical elevation view of the load center of FIG. 1 with the front covers installed.

Referring to FIGS. 1 and 2, a load center 2 includes an enclosure assembly 4, a trim assembly 6, a first interior assembly 8 and a second interior assembly 10. As is conventional, the load center 2 also includes a ground bar assembly 12 and a number of neutral bar assemblies 14.

The example load center 2 is divided into a first or upper (with respect to FIG. 1) section 16 containing the first interior assembly 8 and a second or lower (with respect to FIG. 1)

section 18 containing the second interior assembly 10. A barrier 20 preferably separates the first section 16 from the second section 18. For example, the barrier 20 physically separates the sections 16,18 for UL purposes. The section 18 preferably meets panelboard standards under UL 67. The section 18 preferably meets transfer switch standards under UL 1008. A wire harness 22 electrically connects the first interior assembly 8 and the second interior assembly 10 as will be described.

As is conventional, the load center 2 includes a main circuit breaker 24 (e.g., without limitation, two poles, 200 A).

The main circuit breaker 24 provides power from a first power input 25 for a first power source (e.g., without limitation, utility; primary) 26 (shown in phantom line drawing) to a first bus 28 (e.g., without limitation, 120 VAC and/or 240 VAC) of the first interior assembly 8, which first bus 28 includes a number of circuit breakers of which only example circuit breaker 30 (e.g., without limitation, two pole, 50 A) and circuit breaker 31 (shown in phantom line drawing) are shown. Although two-pole circuit breakers are shown, the invention is applicable to circuit interrupters having any suitable number of poles. The main circuit breaker 24 includes a number of first or line terminals 27 electrically connected to the first power input 25 and a number of second or load terminals 29. The first bus 28 is electrically connected to the number of second or load terminals 29 of the main circuit breaker 24. The circuit breaker 30 includes a number of line terminals 41 (e.g., without limitation, two line terminals are shown) electrically connected to the first bus 28.

In accordance with one aspect of the invention, the first interior assembly 8 also includes a separate second bus 32 (e.g., without limitation, 120 VAC and/or 240 VAC), which second bus 32 includes a number of circuit breakers of which only circuit breakers 33,34 (shown in phantom line drawing) are shown. As will be explained, only circuit breakers, such as 33,34, of the separate second bus 32 are employed to power critical loads. Also, only circuit breakers, such as 31, of the first bus 28 are employed to power non-critical loads. It will be appreciated that the circuit breakers 30,31 operate independently from (e.g., without limitation, do not require any interlock therebetween) the circuit breakers 33,34. Again, the invention is applicable to circuit interrupters having any suitable number of poles.

The wire harness 22 electrically connects the load terminals 39 of the circuit breaker 30 to first input terminals 36 of an automatic transfer switch (ATS) 38 of the second interior assembly 10. The wire harness 22 also electrically connects the input terminals 40 of a sub-feed lug block 42 to the output terminals 44 of the ATS 38. The sub-feed lug block 42, thus, electrically connects the output terminals 44 of the ATS 38 to the second bus 32.

As is conventional, the ATS 38 includes second input terminals 46 for receiving power from a second power input 47 for a second power source 48 (e.g., without limitation, backup; a generator; an auxiliary power unit; an uninterruptible power source).

During normal operation, the critical circuits powered from the second bus 32 are energized by the ATS 38 with power from the first power source 26. As is conventional, the non-critical circuits powered from the first bus 28 are always energized by power, if available, from the first power source 26. When the power from the first power source 26 is interrupted, the ATS 38 recognizes that loss of power, automatically starts, for example, the generator 48, and energizes only the critical circuits powered from the second bus 32 with power from the generator 48 through the output terminals 44 of the ATS 38 and through the sub-feed lug block 42.

As shown in FIG. 2, the load center 2 includes a lower cover plate 50, which covers the second interior assembly 10 of the second or lower section 18 of FIG. 1. The trim assembly 6 includes a door 52 (shown in phantom line drawing). The trim assembly 6 covers most of the first interior assembly 8 of the first or upper section 16 of FIG. 1, except for the exposed portions of circuit breakers, such as 31,33,34 (FIG. 1) that protrude through openings in the trim assembly 6. When closed, the door 52, in turn, covers those exposed portions.

Figure 3:
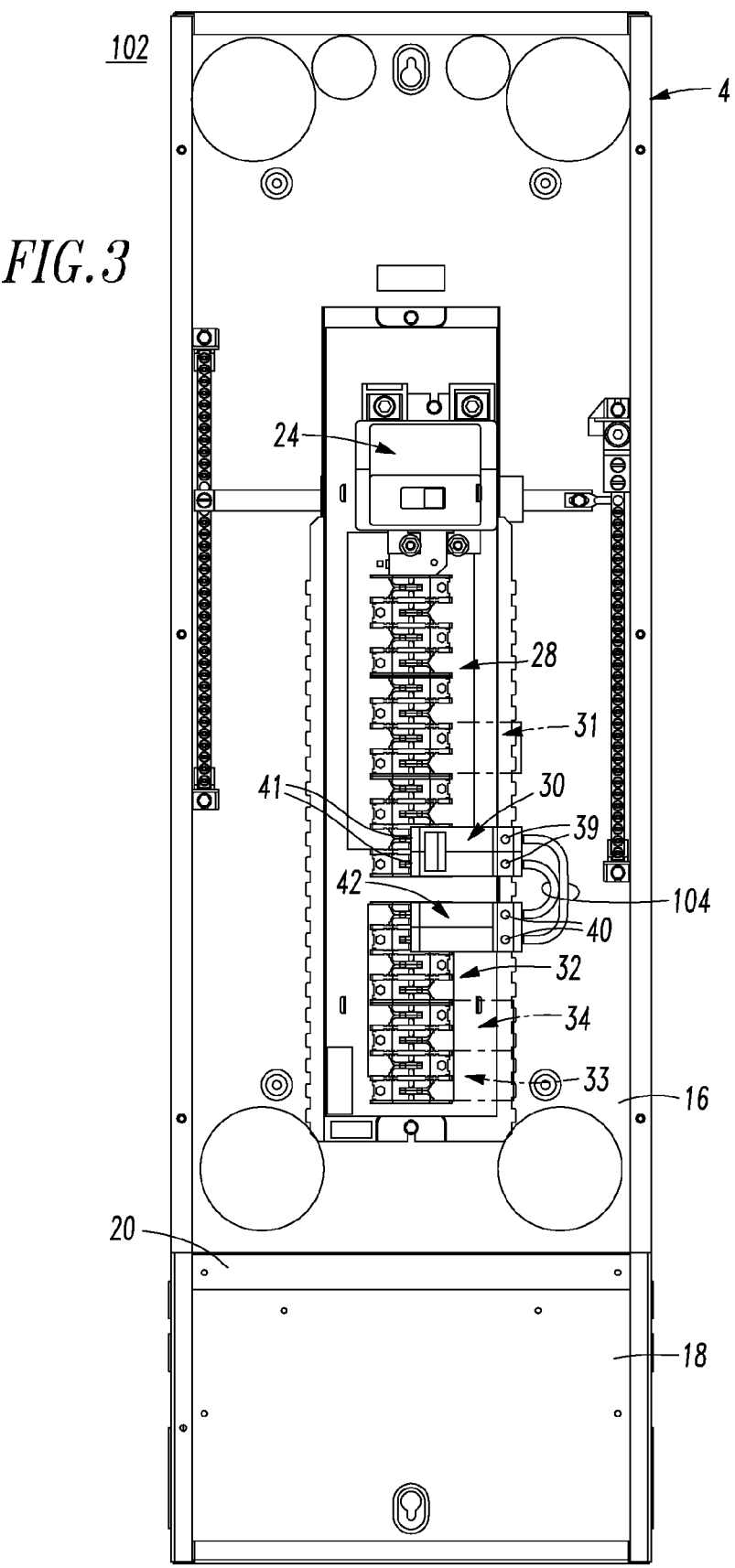
FIG. 3 is a vertical elevation view of a load center with the front covers removed to show internal structures in accordance with another embodiment of the invention.

Referring to FIG. 3, another load center 102 is shown. It will be appreciated that the load center 102 can be similar to the load center 2 of FIG. 1, except that the second interior assembly 10 including the ATS 38 and the wire harness 22 are not included. Instead, in FIG. 3, the branch mounted circuit breaker 30 (e.g., without limitation, CH250 marketed by Eaton Electrical, Inc. of Pittsburgh, Pa.) is electrically connected by jumper assembly 104 to the sub-feed lug block 42 (e.g., without limitation, CHSF2125 marketed by Eaton Electrical, Inc. of Pittsburgh, Pa.) to energize, when the circuit breaker 30 is closed, a number of critical circuits powered from the second bus 32 of the "split bus" (i.e., first bus 28 is electrically split apart from second bus 32) interior. Other non-critical circuits are terminated as part of the first bus 28 of the "split bus" interior. The jumper assembly 104 electrically connects the load terminals 39 of the circuit breaker 30 to the input terminals 40 of the sub-feed lug block 42. The jumper assembly 104 includes jumpers or wires (conductors) that supply power from the branch mounted circuit breaker 30 to the sub-feed lug block 42. For example, these jumpers or wires electrically connect the A and B legs of the first bus 28 (see, for example, the load terminals 39 of the circuit breaker 30) to the corresponding A and B legs (see, for example, the input terminals 40 of the sub-feed lug block 42) of the second bus 32.

Figure 4:
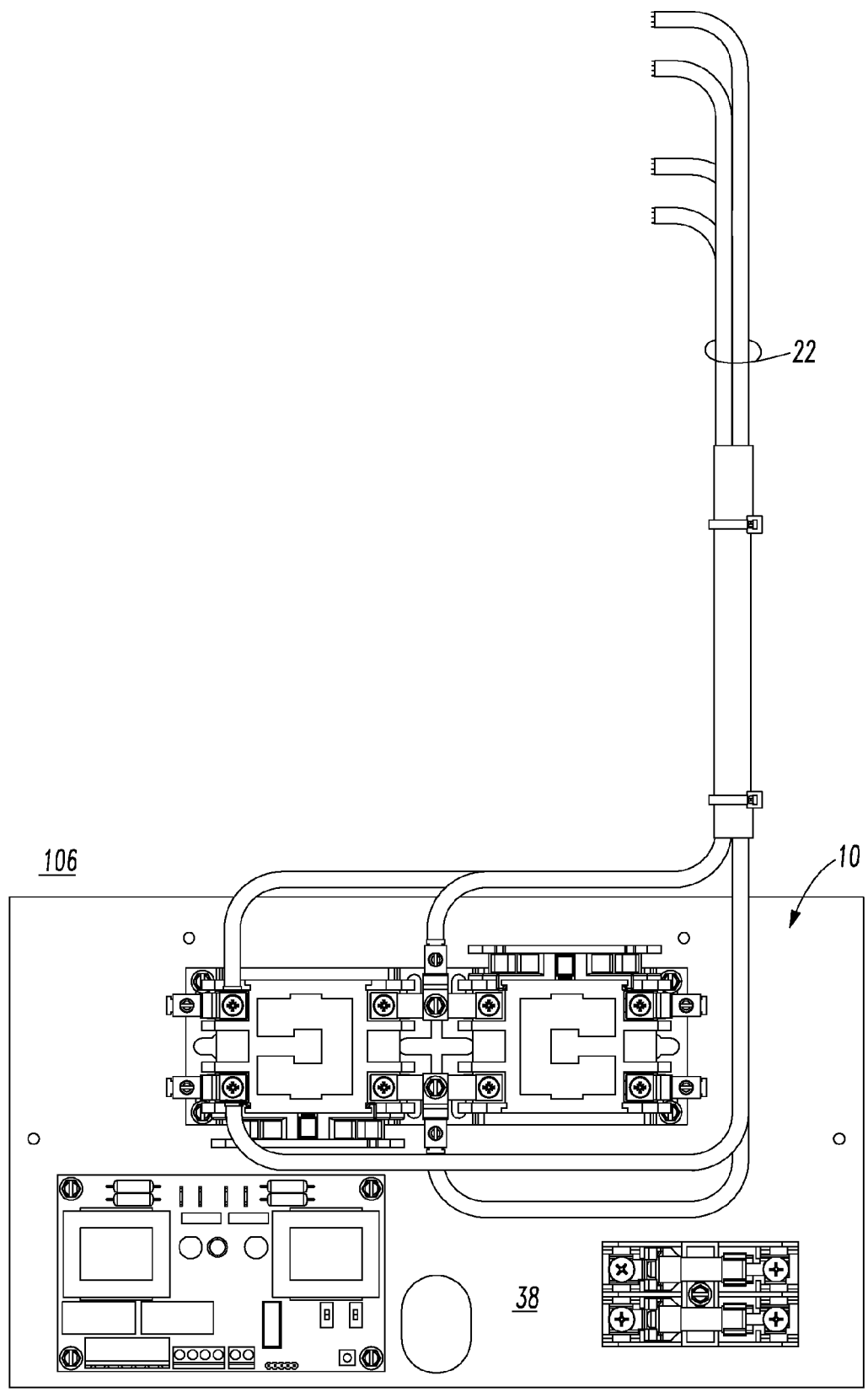
FIG. 4 is a vertical elevation view of an automatic transfer switch kit for retrofitting the load center of FIG. 3.

FIG. 4 shows an ATS kit 106, which includes the second interior assembly 10 having the ATS 38 and the wire harness 22 of FIG. 1.

Figure 5:
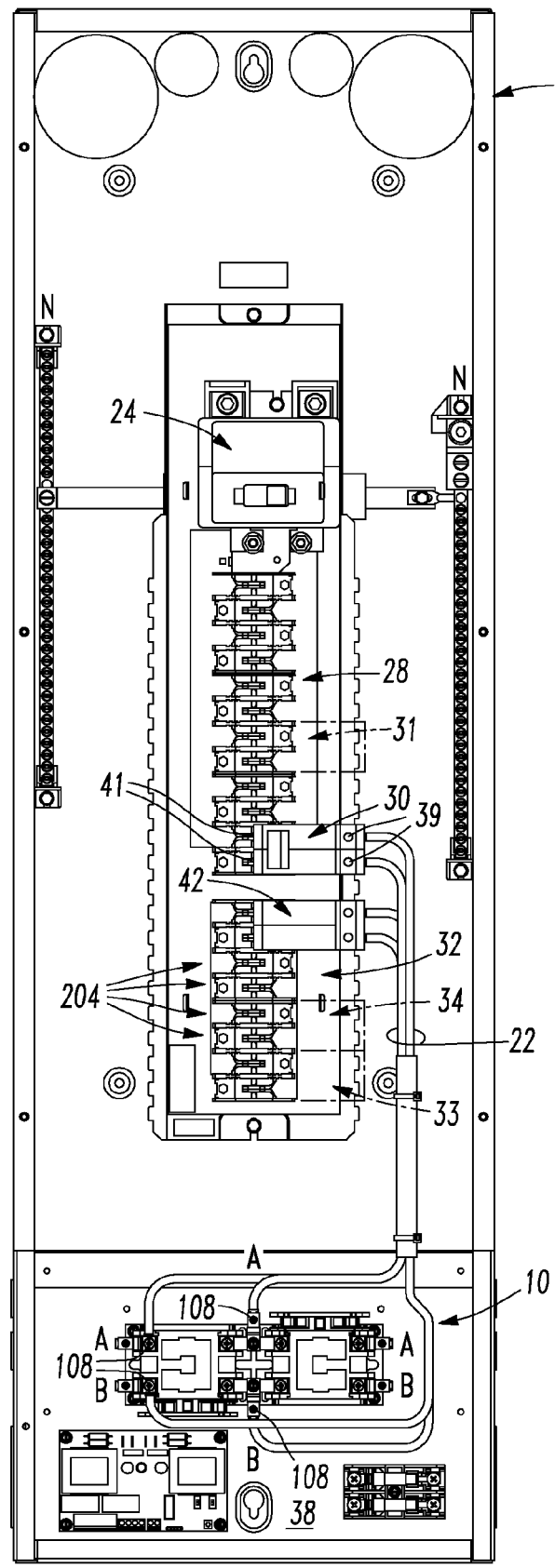
FIG. 5 is a vertical elevation view of the load center of FIG. 3 including the automatic transfer switch kit of FIG. 4.

In FIG. 5, the jumper assembly 104 of FIG. 3 has been removed from the branch mounted circuit breaker 30 and the sub-feed lug block 42, and the ATS kit 106 (FIG. 4) has been installed with four fasteners 108 at the ATS 38. This provides an ATS load center 202 (e.g., without limitation, an ATS/distribution panelboard), which is ready to receive the generator 48 (as shown in FIG. 1), just like the load center 2 of FIG. 1. During normal operation, the critical circuits powered from the second bus 32 are energized by the ATS 38 with power from the first power source 26 (as shown in FIG. 1). The non-critical circuits powered from the first bus 28 are always energized by power, if available, from the first power source 26. When the power from the first power source 26 is interrupted, the ATS 38 recognizes the loss of power, automatically starts the generator 48, and energizes only the critical circuits powered from the second bus 32 with power from the generator 48.

Example 1

Although an example 50A version of the critical circuits of the ATS load center 202 is disclosed, a wide range of other current ratings can be provided. The branch mounted circuit breaker 30 can be a plug-on, two pole, 50 A, 240 V circuit breaker. This circuit breaker 30, when closed, supplies the second bus 32 of the load center 202 with first power from the first power source 26 (as shown in FIG. 1) under normal operation. After the ATS kit 106 (FIG. 4) is installed, the circuit breaker 30, when closed, energizes the ATS 38 until the first power is interrupted. After the first power is interrupted, the electronics (not shown) of the ATS 38 recognize the interruption and automatically start the generator 48 (as shown in FIG. 1).

Example 2

The sub-feed lug block 42 becomes the point of electrical connection for power being supplied to the second bus 32 of the load center 202. The example sub-feed lug block 42 is two pole, 125 A. The sub-feed lug block 42 provides power to the second bus 32 of the load center 202, whether it is initially supplied from the branch mounted circuit breaker 30 (FIG. 3) or from the ATS 38 (FIGS. 1 and 5) after the ATS kit 106 (FIG. 4) has been installed.

Example 3

The example ATS 38 has two legs, A and B. Leg A to neutral N provides 120 V, leg B to neutral N provides 120 V, and leg A to opposite leg B provides 240 V, although the invention is applicable to an ATS having any number of legs and/or any suitable number of voltages.

Example 4

The example ATS 38 is a Cutler Hammer EGS50L marketed by Eaton Electrical, Inc. of Pittsburgh, Pa. Alternatively, the ATS 38 may have any suitable current rating (e.g., without limitation, 100 A; 200 A; any suitable current rating).

Example 5

The load requirements of the critical loads powered from the second bus 32 and the output rating of the generator 48 (as shown in FIG. 1) determine the amperage rating of the branch mounted circuit breaker 30, the sub-feed lug block 42 and the ATS 38. For example, by increasing the amperage of the circuit breaker 30 and the bus bars 204 on the interior, and by increasing the size of the generator 48, the load center 202 can support relatively larger loads (e.g., without limitation, 225 A).

The disclosed load center 102 (FIG. 3) permits, for example, a homeowner, contractor or developer, to install the load center 102 during construction and, at a later date, inexpensively add the ATS 38 (FIGS. 4 and 5). During initial construction, the load center 102 is installed in a conventional manner with one exception. All critical loads are always terminated from corresponding circuit breakers of the second bus 32 of the "split bus" interior. All non-critical loads are always terminated from corresponding circuit breakers of the first bus 28 of the "split bus" interior.

In turn, at any future date, the ATS kit 106 (FIG. 4) is installed in the load center 102 (FIG. 3) to provide the example ATS load center 202 (FIG. 5). Preferably, the resulting load center 202 is NEC 2008 compliant.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An electrical distribution panel comprising:
an enclosure;
a first power input;
a second power input;
a first circuit interrupter including a first terminal electrically connected to said first power input and a second terminal;
a first bus electrically connected to the second terminal of said first circuit interrupter;
a number of second circuit interrupters powered from said first bus;
a second bus;
a number of third circuit interrupters powered from said second bus;
a transfer switch including a first input electrically connected to said first bus, a second input electrically connected to said second power input, and an output electrically connected to said second bus, said transfer switch being structured to selectively electrically connect one of the first and second inputs of said transfer switch to the output of said transfer switch,
wherein said first bus and said number of second circuit interrupters are structured to power only a number of non-critical loads,
wherein said second bus and said number of third circuit interrupters are structured to power only a number of critical loads, which are different than said number of non-critical loads, and
wherein said second circuit interrupters operate independently from said third circuit interrupters.

2. The electrical distribution panel of claim 1 wherein said first power input is structured to receive a primary power source; and wherein said second power input is structured to receive a backup power source.

3. The electrical distribution panel of claim 2 wherein said primary power source is a utility power source; and wherein said backup power source is one of a generator, an auxiliary power unit, and an uninterruptible power source.

4. The electrical distribution panel of claim 1 wherein said critical loads are selected from the group consisting of a heating, ventilation and air conditioning load; a sump pump; a refrigerator; a freezer; an alarm system; and a medical device.

5. The electrical distribution panel of claim 1 wherein said first power input and said second power input both include a first power leg structured to receive a first power phase and a second power leg structured to receive an opposite second power phase.

6. The electrical distribution panel of claim 1 wherein said transfer switch is an automatic transfer switch.

7. The electrical distribution panel of claim 6 wherein one of said number of second circuit interrupters is a closed circuit interrupter that electrically connects the first input of said automatic transfer switch to said first bus.

8. The electrical distribution panel of claim 6 wherein a sub-feed lug block electrically connects the output of said automatic transfer switch to said second bus.

9. The electrical distribution panel of claim 1 wherein said enclosure comprises a first compartment enclosing said first circuit interrupter, said first bus, said number of second circuit interrupters, said second bus, and said number of third circuit interrupters, and further comprises a separate second compartment enclosing said transfer switch.

10. The electrical distribution panel of claim 9 wherein said enclosure further comprises a barrier separating said first compartment from said separate second compartment.

11. An electrical distribution panel comprising:
an enclosure comprising a first compartment and a separate second compartment;
a first power input;

a first circuit interrupter including a first terminal electrically connected to said first power input and a second terminal;

a first bus electrically connected to the second terminal of said first circuit interrupter;

a plurality of second circuit interrupters powered from said first bus;

a second bus electrically connected to said first bus through one of said second circuit interrupters;

a number of third circuit interrupters powered from said second bus;

wherein said first bus and said number of second circuit interrupters are structured to power only a number of first loads, wherein said second bus and said number of third circuit interrupters are structured to power only a number of second loads, and wherein said second compartment is structured to receive a transfer switch including a first input electrically connectable to said first bus, a second input electrically connectable to a second power input, and an output electrically connectable to said second bus, said transfer switch being structured to selectively electrically connect one of the first and second inputs of said transfer switch to the output of said transfer switch.

12. The electrical distribution panel of claim 11 wherein said first power input is structured to receive a primary power source; and wherein said second power input is structured to receive a backup power source.

13. The electrical distribution panel of claim 12 wherein said primary power source is a utility power source; and wherein said backup power source is one of a generator, an auxiliary power unit, and an uninterruptible power source.

14. The electrical distribution panel of claim 11 wherein said number of first loads are selected from the group consisting of a heating, ventilation and air conditioning load; a sump pump; a refrigerator; a freezer; an alarm system; and a medical device.

15. The electrical distribution panel of claim 11 wherein said first power input and said second power input both include a first power leg structured to receive a first power phase and a second power leg structured to receive an opposite second power phase.

16. The electrical distribution panel of claim 11 wherein said transfer switch is an automatic transfer switch.

17. The electrical distribution panel of claim 16 wherein said one of said second circuit interrupters is a closed circuit breaker comprising a line terminal electrically connected to said first bus, and a load terminal electrically connected to said second bus.

18. The electrical distribution panel of claim 17 wherein a sub-feed lug block electrically connects the load terminal of said one of said second circuit interrupters to said second bus.

19. The electrical distribution panel of claim 17 wherein a sub-feed lug block and a number of conductors electrically connect the load terminal of said one of said second circuit interrupters to said second bus; and wherein said number of conductors are removable to permit the first input of said transfer switch to be electrically connected to the load terminal of said one of said second circuit interrupters, and to permit the output of said transfer switch to be electrically connected to said second bus.

20. The electrical distribution panel of claim 11 wherein said first compartment encloses said first circuit interrupter, said first bus, said plurality of second circuit interrupters, said second bus, and said number of third circuit interrupters.

21. The electrical distribution panel of claim 20 wherein said enclosure further comprises a barrier separating said first compartment from said separate second compartment.

22. The electrical distribution panel of claim 11 wherein said second circuit interrupters operate independently from said third circuit interrupters.

23. The electrical distribution panel of claim 11 wherein said one of said second circuit interrupters is a circuit breaker comprising a line terminal electrically connected to said first bus, and a load terminal; wherein a number of conductors electrically connect the load terminal of said one of said second circuit interrupters to said second bus; and wherein said number of conductors are removable to permit the first input of said transfer switch to be electrically connected to the load terminal of said one of said second circuit interrupters, and to permit the output of said transfer switch to be electrically connected to said second bus.

* * * * *